United States Patent
Tanaka

(10) Patent No.: US 9,150,051 B2
(45) Date of Patent: Oct. 6, 2015

(54) PNEUMATIC TIRE

(71) Applicant: SUMITOMO RUBBER INDUSTRIES, LTD., Kobe-shi, Hyogo (JP)

(72) Inventor: Susumu Tanaka, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 174 days.

(21) Appl. No.: 13/731,600

(22) Filed: Dec. 31, 2012

(65) Prior Publication Data

US 2013/0213545 A1  Aug. 22, 2013

(30) Foreign Application Priority Data

Feb. 17, 2012  (JP) ................... 2012-033103

(51) Int. Cl.
| | |
|---|---|
| *B60C 3/00* | (2006.01) |
| *B60C 13/00* | (2006.01) |
| *B60C 3/04* | (2006.01) |
| *B60C 13/02* | (2006.01) |
| *B60C 11/01* | (2006.01) |

(52) U.S. Cl.
CPC . *B60C 3/04* (2013.01); *B60C 11/01* (2013.01); *B60C 13/02* (2013.01); *B60C 2011/013* (2013.04); *B60C 2013/006* (2013.04); *B60C 2013/007* (2013.04)

(58) Field of Classification Search
CPC ............ B60C 3/00; B60C 13/00; B60C 13/02
See application file for complete search history.

(56) References Cited

U.S. PATENT DOCUMENTS

| 4,215,734 A | * | 8/1980 | Suzuki et al. ............... 152/209.1 |
| 2010/0032071 A1 | * | 2/2010 | Miyazaki ....................... 152/525 |

FOREIGN PATENT DOCUMENTS

| EP | 486274 | * | 4/1995 |
| JP | 10-147113 | * | 6/1998 |
| JP | 11-001103 A | | 1/1999 |

* cited by examiner

*Primary Examiner* — Justin Fischer
(74) *Attorney, Agent, or Firm* — Birch, Stewart, Kolasch & Birch, LLP

(57) ABSTRACT

A pneumatic tire having a tread portion, a pair of sidewall portions, a pair of bead portions each with a bead core therein, wherein in a tire meridian section including a tire axis under a standard state that the tire is mounted on a standard rim and inflated to a standard pressure but loaded with no tire load, the tread portion has a tread width TW (mm) being from 80 to 90% of a nominal tire width YW, a profile from a shoulder region of the tread portion to the sidewall portion includes a shoulder profile for defining the shoulder portion, a sidewall profile for defining at least a part of the sidewall portion, and a buttress profile smoothly connecting between the shoulder profile and the sidewall profile.

10 Claims, 3 Drawing Sheets

PNEUMATIC TIRE

BACKGROUND OF THE INVENTION

1. Field of the Invention

The present invention relates to a pneumatic tire having an improved profile which improves the ride comfort, low rolling resistance and braking performance.

2. Description of the Related Art

A pneumatic tire has a profile extending from an axially outside shoulder region of the tread portion to the sidewall portion that usually determines the ride comfort, low rolling resistance and braking performance. Referring to FIG. 3, the tire has a tread portion "a" including the shoulder portion b. In case that the profile "e" of the shoulder portion b is modified so as to have a large radius R1 of curvature shown by a virtual line from a radius R2 of curvature, since the shoulder portion b would be rounded, the ride comfort may be improved due to the reduced contact pressure acting on the shoulder portion b. Also, since the rubber thickness disposed on the shoulder portion b tends to be thinner, the rolling resistance of the tire may be decreased due to the small tire weight.

However, such a tire is liable to have an unsatisfactory braking performance due to a small ground contact area of the tread portion.

In order to improve the braking performance of the tire, the tread width may be enlarged so as to have a large ground contact area. However, if the tread width is enlarged, the rubber thickness on the buttress portion disposed in between the tread portion and the sidewall portion is liable to increase, and thereby the rolling resistance may deteriorate due to a heavy tire weight. Moreover, the ride comfort may also deteriorate due to the less deformation of the buttress portion.

In order to improve various performances, a tire having a tread profile that extends along with an involutes line is proposed. The tread profile, for example, has a radius of curvature gradually decreasing from the tire equator to the axially outside of the tire so that the ground contact pressure on the tread portion is uniform in the tire axial direction, and thereby wear resistance and the steering stability may be improved.

However, since such a profile is not sufficiently improved as for the tread shoulder portion and the sidewall portion, the ride comfort, rolling resistance and the braking performance may be deteriorated.

SUMMARY OF THE INVENTION

The present invention has been worked out in light of the circumstances described above, and has a main object of providing a pneumatic tire having an improved profile which improves the ride comfort, low rolling resistance and braking performance.

In accordance with the present invention, there is provided a pneumatic tire comprising a tread portion, a pair of sidewall portions, a pair of bead portions each having a bead core therein, a carcass extending between bead cores through the tread portion and sidewall portions, a belt disposed radially outside the carcass in the tread portion, wherein in a tire meridian section including a tire axis under a standard state that the tire is mounted on a standard rim and inflated to a standard pressure but loaded with no tire load, the tread portion has a tread width TW (mm) being from 80 to 90% of a nominal tire width YW, a profile from a shoulder region of the tread portion to the sidewall portion includes: a shoulder profile for defining the shoulder portion which is an arc having its center inside of the tire and has a radius of curvature of from 35 to 55 mm; a sidewall profile for defining at least a part of the sidewall portion which is an arc having its center inside of the tire; and a buttress profile smoothly connecting between the shoulder profile and the sidewall profile, wherein the buttress profile is an arc having its center outside of the tire and has a radius of curvature of from 20 to 60 mm.

DETAILED DESCRIPTION

An embodiment of the present invention will be explained below with reference to the accompanying drawings.

Figure 1:
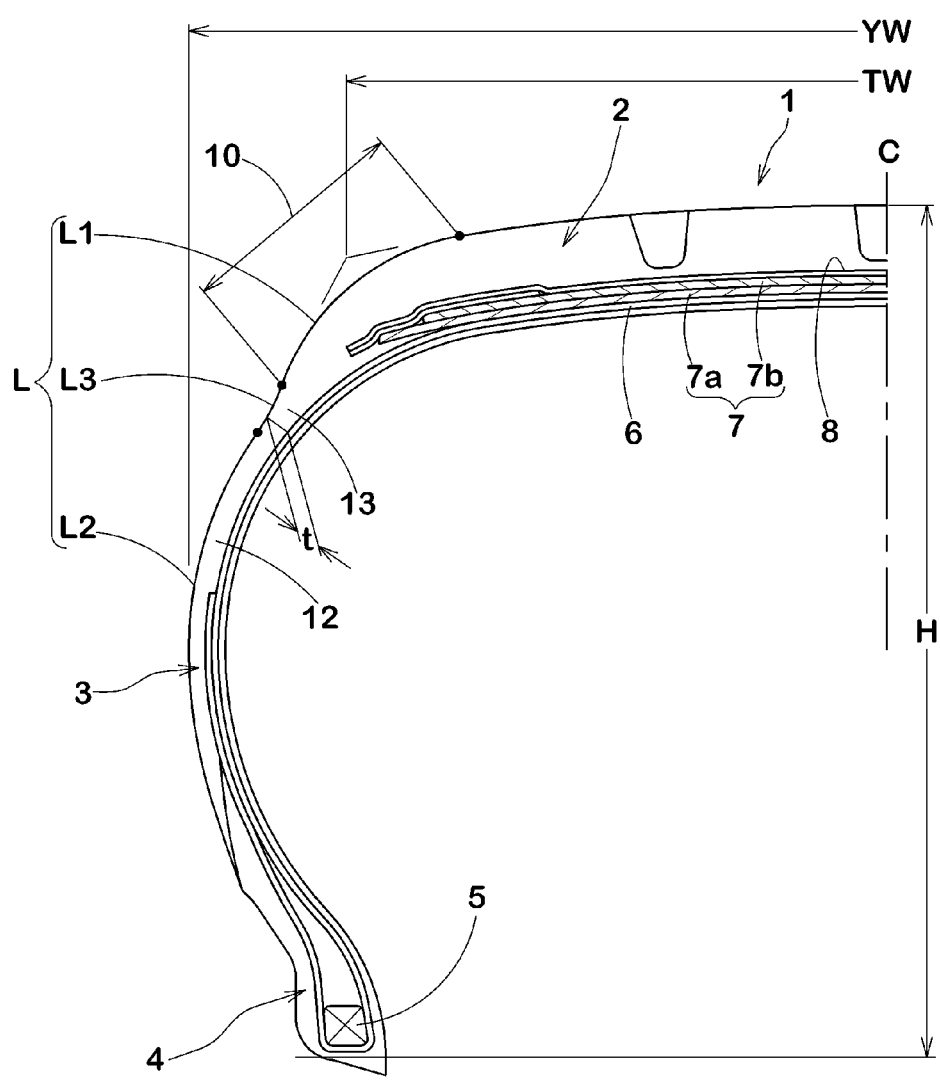
FIG. 1 is a left side cross sectional view of a pneumatic tire showing an embodiment of the present invention.

FIG. 1 shows a pneumatic tire 1 in accordance with the present embodiment, in a tire meridian section including a tire axis under a standard state. Here, the standard state is such that the tire 1 is mounted on a standard wheel rim and is inflated to a standard pressure but loaded with no tire load.

The standard wheel rim is a wheel rim officially approved or recommended for the tire by standards organizations, the standard wheel rim is the "standard rim" specified in JATMA, the "Measuring Rim" in ETRTO, the "Design Rim" in TRA or the like, for example. The standard pressure is the "maximum air pressure" in JATMA, the "Inflation Pressure" in ETRTO, and the maximum pressure given in the "Tire Load Limits at various Cold Inflation Pressures" table in TRA or the like. In case of passenger car tires, however, the standard pressure is uniformly defined by 180 kPa.

As shown in FIG. 1, the pneumatic tire 1 in accordance with the present embodiment comprises: a tread portion 2; a pair of sidewall portions 3 each of which extends radially inward from the axially outer end of the tread portion 2; and a pair of bead portions 4 each of which is provided radially inside the sidewall portion 3 and has a bead core 5 therein. The tire 1, for example, is illustrated as a passenger car tire having an aspect ratio of 65% in this embodiment. The aspect ratio means a ratio of a tire section height H to a nominal tire width YW.

The tire 1 includes: a carcass 6 extending between bead cores 5 through the tread portion 2 and sidewall portions 3; and a belt 7 disposed radially outside the carcass 6 in the tread portion 2.

The carcass 6 includes at least one carcass ply (one carcass ply is provided in this embodiment) which is composed of rubberized carcass cords arranged at an angle in the range of from 70 to 90 degrees with respect to the tire equator C. For the carcass cords, organic fiber cords, e.g. polyester, nylon, rayon, aramid and the like can be used.

The belt 7 comprises, in this embodiment, two belt plies 7a and 7b of steel cords laid at an angle of from 10 to 35 degrees with respect to the tire equator C so that each steel cord of plies is crossed. Accordingly, the rigidity of the tread portion 2 is firmly enhanced. For the belt cords, organic fiber cords, e.g. aramid, rayon and the like can be also used.

In order to improve the high speed durability of the tire, a band layer 8 having band cords of from 0 to 5 degrees with respect to the tire equator C is preferably provided on the belt 7. Preferably, the band 8 covers at least axially both end portions of the belt 7 to prevent the lifting thereof at high speed running. For the band cords, organic fiber cords having low elastic modulus can be preferably used.

In the tire meridian section including the tire axis under the standard state, the tread portion 2 has a tread width TW (mm) being from 80 to 90% of the nominal tire width YW.

Here, the tread width TW is the width measured under the standard state, as the axial distance between the tread edges. The tread edges are the axial outermost edges of the ground contacting patch which occurs under a loaded condition when the camber angle of the tire is zero. The loaded condition is such that the tire is mounted on the standard wheel rim and inflated to the standard pressure and loaded with a standard tire load. The standard load is the "maximum load capacity" in JATMA, the "Load capacity" in ETRTO, and the maximum value given in the above-mentioned table in TRA or the like. In case of passenger car tires, however, the standard tire load is uniformly defined by 88% of the maximum tire load.

Figure 2:
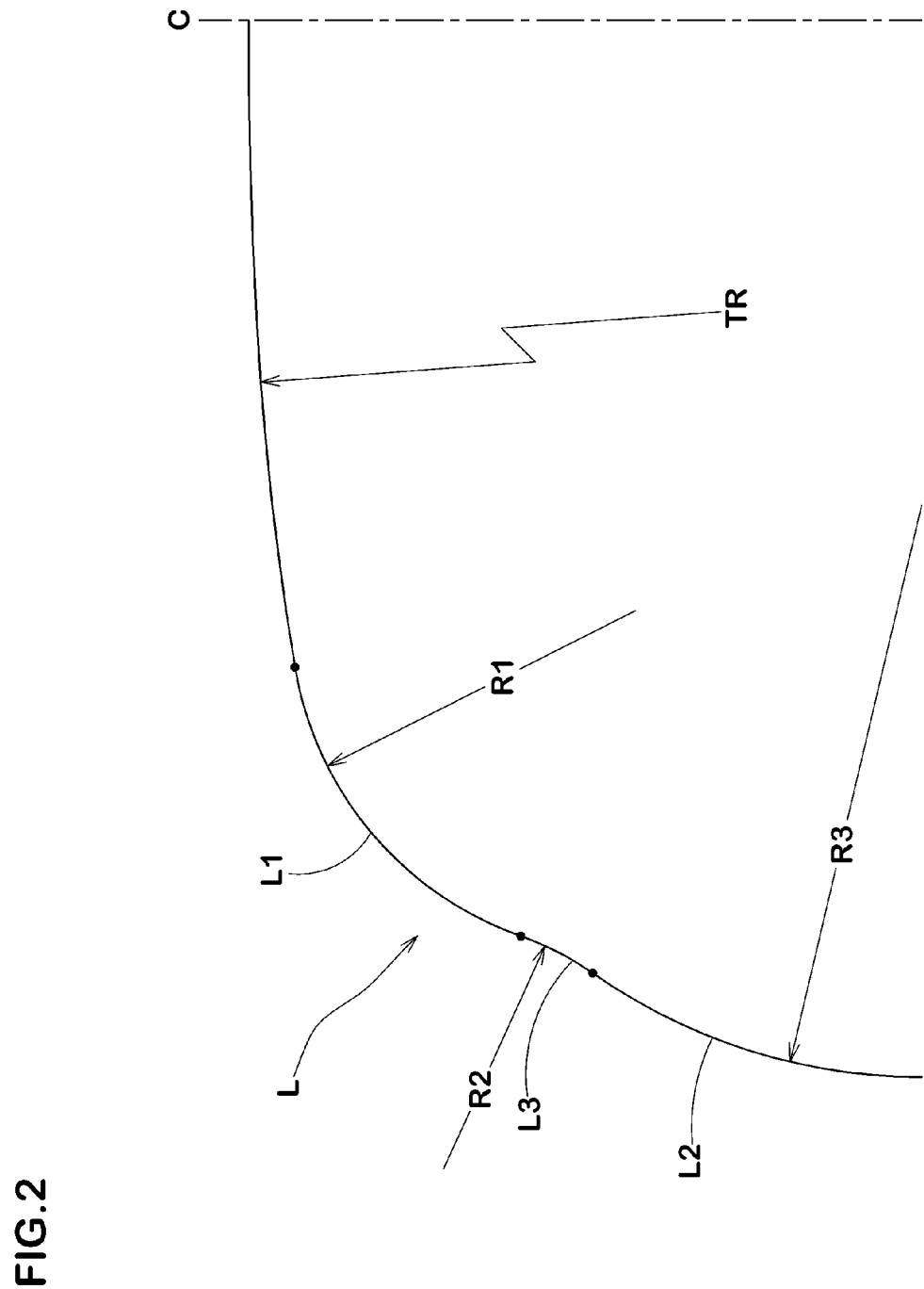
FIG. 2 is a profile of the tire of FIG. 1.
Figure 3:
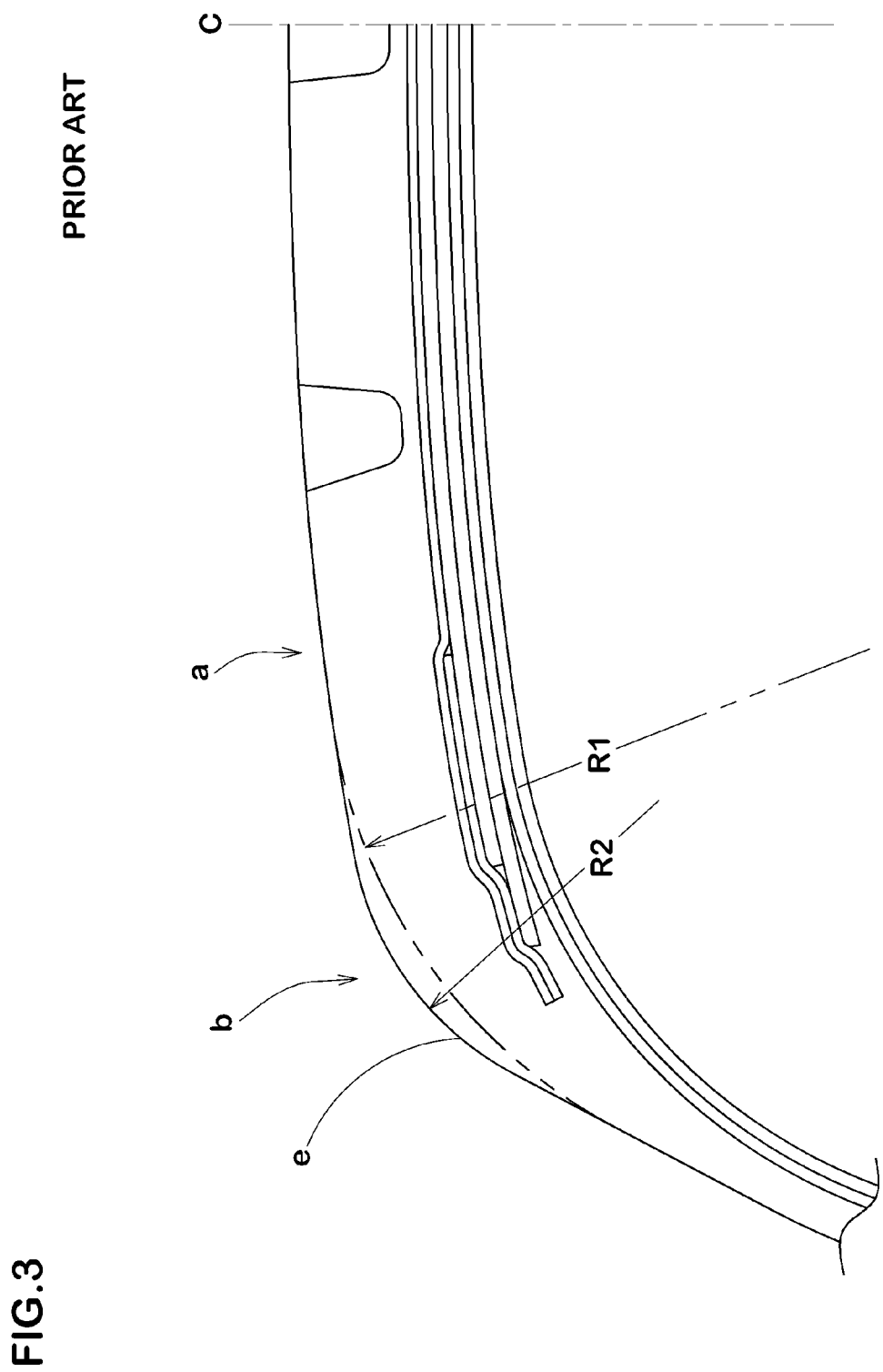
FIG. 3 is a cross sectional view of a conventional pneumatic tire.

Moreover, referring to FIGS. 1 and 2, a tire profile L from a shoulder region 10 of the tread portion 2 to the sidewall portion 3 is improved so as to include: a shoulder profile L1 for defining the shoulder portion 10 which is an arc having its center inside of the tire and has a radius R1 of curvature of from 35 to 55 mm; a sidewall profile L2 for defining at least a part of the sidewall portion 3 which is an arc having its center inside of the tire; and a buttress profile L3 smoothly connecting between the shoulder profile L1 and the sidewall profile L2, wherein the buttress profile L3 is an arc having its center outside of the tire and has a radius R3 of curvature of from 20 to 60 mm. The tread crown portion between the shoulder portions 10, for example, has a profile having a radius TR of curvature of from 50 to 800 mm.

Since the shoulder profile L1 has a comparatively large radius R1 of curvature of from 35 to 55 mm, contact pressure acting on the shoulder portion 10 tends to reduce, and thereby the ride comfort improves. Moreover, a rubber thickness disposed on the shoulder portion 10 tends to be thin, the rolling resistance of the tire decreases due to the weight reduction of the tire. Moreover, since the tread width TW (mm) is set in a range of from 80 to 90% of the nominal tire width YW (mm), a large ground-contacting width of the tread portion 2 is obtained, and thereby the braking performance also improves. Moreover, since the buttress profile L3 is formed as an arc having its center outside of the tire and has a radius R3 of curvature of from 20 to 60 mm, a rubber thickness on the buttress portion tends to be thin, and thereby the rolling resistance is further reduced due to the weight reduction.

The buttress profile L3 provides a dent on an outer surface of the tire which improves flexibility of the sidewall portion 3 when a tire load is loaded. Accordingly, the deformation of the sidewall portion 3 during running tends to be greater than that of the tread portion 2. Generally, the influence of the deformation in the tread portion 2 against the rolling resistance is greater than that of the sidewall portion 3. Therefore, since the tire 1 in accordance with the present invention has comparatively small deformation in the tread portion 2, the rolling resistance is also decreased. Moreover, since the sidewall portion 3 effectively absorbs impacts from the ground, the ride comfort is also improved.

Here, when the tread width TW is less than 80% to the nominal tire width YW, the ground contacting area of the tread portion 2 is liable to decrease, and thereby the braking performance is deteriorated. when the tread width TW is more than 90% to the nominal tire width YW, a rubber thickness on the buttress portion and the sidewall portion 3 tend to be thick, and thereby the rolling resistance may be increased. Preferably, the tread width TW is in a range of from 85 to 90% the nominal tire width YW.

When the radius R1 of curvature of the shoulder profile L1 is less than 35 mm, ground contact pressure acting on the tread edges tends to be large, and thereby the ride comfort is liable to deteriorate. when the radius R1 of curvature of the shoulder profile L1 is more than 55 mm, sufficiently ground contact area may not be obtained. Preferably, the radius R1 of curvature of the shoulder profile L1 is in a range of from 40 to 50 mm.

When the radius R3 of curvature of the buttress profile L3 is less than 20 mm, a rubber thickness on the buttress portion tends to be thin, and thereby the stress concentration and damages may easy to occur thereon. when the radius R3 of curvature of the buttress profile L3 is more than 60 mm, a rubber thickness on the buttress portion tends to be thick, and thereby the rolling resistance may be deteriorate. The radius R3 of curvature of the buttress profile L3 is more preferably not more than 45 mm, still further preferably not more than 35 mm, and more preferably not less than 25 mm.

The sidewall portion 3 includes a sidewall rubber 12 disposed axially outside the carcass 6. The sidewall rubber 12 has a loss tangent of less than 0.14 measured at 70 degrees celsius. The rubber composition of the sidewall rubber 12 preferably includes a polybutadiene rubber having a large amount of a linear component. The polybutadiene rubber having with a large amount of a linear component means a polybutadiene rubber having fewer branches of molecular. By adding the polybutadiene rubber described above into the rubber composition, a rubber material with a high hardness and low thermogenic may be produced. For the polymer in the rubber composition of the sidewall rubber 12, diene based rubber, such as natural rubber (NR), polybutadiene rubber other than the former one, and polyisoprene rubber (IR) may also be used.

In order to improve the resistance of fatigue from the flexing of the sidewall portion 3 and the rolling resistance, the sidewall rubber 12 preferably has the loss tangent in a range of from 0.06 to 0.14 measured at 70 degrees Celsius.

Here, the loss tangent (tan δ) is the value obtained by measuring a specimen of 4 mm (width)×30 mm (length)×2 mm (thickness), in the conditions of temperature of 70 degrees Celsius, amplitude of dynamic strain of plus/minus 2%, and frequency of 10 Hz, by using a viscoelastic spectrometer made by IWAMOTO SEISAKUSYO.

For a buttress rubber 13 disposed between the buttress profile L3 and the carcass 6, diene based rubber, such as natural rubber (NR), polybutadiene rubber, and polyisoprene rubber (IR) may be preferably used. Referring to FIG. 1, the buttress rubber 13 has a minimum thickness t from the buttress profile L3 to an outer surface of the carcass 6 being from 1.5 to 8 mm in order to improve the cut resistance and the rolling resistance.

The present invention is more specifically described and explained by means of the following Examples and References. It is to be understood that the present invention is not limited to these Examples. For instance, an arc formed by multiple radiuses gradually changing may be used for each profile L1, L2 and L3. moreover, the profiles L on both sides of the sidewall portions 2 may be formed as un-symmetrical with respect to the tire equator C.

Comparison Test

Pneumatic tires for passenger cars of size 195/65R15 having the same internal structure of FIG. 1 except for details shown in Table 1 were made, and tested. As to the References 1 to 5 and 8, each center of radius of the buttress profiles thereof is located inside of the tire. Test methods are as follows.

Ride Comfort Test:

The test tires were mounted on wheel rims of 15×6JJ with an inner pressure of 230 kPa, and installed in a vehicle (FF car with a displacement of 1,800 cc), the test driver drove the vehicle on a test course, and evaluated ride comfort by the test driver's feelings. The results are indicated in Table 1 by scores based on Ref. 1 being 6, wherein the larger the score, the better the ride comfort is.

Braking Performance Test:

The test car above was driven on the test course and suddenly braked at a speed of 100 km/hr so that the ABS worked. The braking distance of each tires were measured. The results are shown with an index of 100 representing a value in Ref. 1.

Rolling Resistance Test:

The test tire was mounted on a wheel rim of 15×6JJ with an inner pressure of 230 kPa and the rolling resistance was measured at a speed of 80 km/h and a tire load of 4.2 kN, using a tester. The results are indicated by an index based on Ref. 1 being 100. The smaller the index, the better the rolling resistance is.

Durability Test:

After tests above, presence of cracks on the buttress rubber of each tire was checked.

TABLE 1

|  | Ref. 1 | Ref. 2 | Ref. 3 | Ref. 4 | Ref. 5 | Ref. 6 | Ref. 7 | Ref. 8 | Ex. 1 | Ex. 2 |
|---|---|---|---|---|---|---|---|---|---|---|
| Ratio TW/YW | 0.78 | 0.78 | 0.85 | 0.85 | 0.85 | 0.85 | 0.94 | 0.94 | 0.8 | 0.8 |
| Radius R1 of shoulder profile (mm) | 30 | 40 | 40 | 40 | 40 | 40 | 40 | 60 | 35 | 35 |
| Radius R3 of buttress profile (mm) | Absence | Absence | Absence | 15 | 65 | Absence | Absence | Absence | 20 | 60 |
| Loss tangent of sidewall rubber | 0.14 | 0.14 | 0.14 | 0.14 | 0.14 | 0.06 | 0.14 | 0.14 | 0.14 | 0.14 |
| Ride comfort (Mark) | 6 | 7.5 | 7 | 8 | 7 | 7 | 6.75 | 7.5 | 8.25 | 7.75 |
| Rolling resistance (Index) | 100 | 94 | 106 | 96 | 103 | 100 | 110 | 100 | 90 | 93 |
| Braking performance (Index) | 100 | 95 | 105 | 105 | 105 | 105 | 108 | 92 | 100 | 100 |
| Durability | OK | OK | OK | NG | OK | OK | OK | OK | OK | OK |

|  | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|
| Ratio TW/YW | 0.8 | 0.85 | 0.85 | 0.85 | 0.85 | 0.85 | 0.85 | 0.85 | 0.85 | 0.85 |
| Radius R1 of shoulder profile (mm) | 55 | 35 | 35 | 35 | 40 | 40 | 40 | 40 | 50 | 50 |
| Radius R3 of buttress profile (mm) | 20 | 20 | 45 | 60 | 20 | 45 | 60 | 20 | 20 | 45 |
| Loss tangent of sidewall rubber | 0.14 | 0.14 | 0.14 | 0.14 | 0.14 | 0.14 | 0.14 | 0.06 | 0.14 | 0.14 |
| Ride comfort (Mark) | 8.75 | 7.75 | 7.5 | 7.25 | 8 | 7.75 | 7.5 | 8 | 8.25 | 8 |
| Rolling resistance (Index) | 85 | 98 | 100 | 102 | 96 | 98 | 99 | 93 | 90 | 92 |
| Braking performance (Index) | 95 | 108 | 108 | 108 | 105 | 105 | 105 | 105 | 102 | 102 |
| Durability | OK | OK | OK | OK | OK | OK | OK | OK | OK | OK |

|  | Ex. 13 | Ex. 14 | Ex. 15 | Ex. 16 | Ex. 17 | Ex. 18 | Ex. 19 |
|---|---|---|---|---|---|---|---|
| Ratio TW/YW | 0.85 | 0.85 | 0.85 | 0.85 | 0.9 | 0.9 | 0.9 |
| Radius R1 of shoulder profile (mm) | 50 | 55 | 55 | 55 | 35 | 35 | 55 |
| Radius R3 of buttress profile (mm) | 60 | 20 | 45 | 60 | 20 | 60 | 20 |
| Loss tangent of sidewall rubber | 0.14 | 0.14 | 0.14 | 0.14 | 0.14 | 0.14 | 0.14 |
| Ride comfort (Mark) | 7.75 | 8.5 | 8.25 | 8 | 7.25 | 6.75 | 7.75 |
| Rolling resistance (Index) | 93 | 90 | 92 | 94 | 103 | 105 | 98 |
| Braking performance (Index) | 102 | 100 | 100 | 100 | 115 | 115 | 110 |
| Durability | OK | OK | OK | OK | OK | OK | OK |

From the test results, it was confirmed that the ride comfort, rolling resistance and braking performance of example tires in accordance with the present invention can be effectively improved compared to references.

The invention claimed is:

1. A pneumatic tire comprising
a tread portion;
a pair of sidewall portions;
a pair of bead portions each having a bead core therein;
a carcass extending between bead cores through the tread portion and sidewall portions; and
a belt disposed radially outside the carcass in the tread portion, wherein
in a tire meridian section including a tire axis under a standard state that the tire is mounted on a standard rim and inflated to a standard pressure but loaded with no tire load,
the tread portion has a tread width TW (mm) being from 80 to 90% of a nominal tire width YW, and
a profile of an outer surface of the tire from a shoulder region of the tread portion to the sidewall portion includes:
a shoulder profile for defining the shoulder portion which is an arc having its center inside of the tire and has a radius of curvature of from 35 to 55 mm;
a sidewall profile for defining at least a part of the sidewall portion which is an arc having its center inside of the tire; and
a buttress profile smoothly connecting between the shoulder profile and the sidewall profile, wherein the buttress profile is an arc having its center outside of the tire and has a radius of curvature of from 20 to 60 mm.

2. The tire according to claim 1, wherein
the tread width TW (mm) is in a range of from 85 to 90% of the nominal tire width YW.

3. The tire according to claim 2, wherein
the radius of curvature of the shoulder profile is in a range of from 40 to 50 mm.

4. The tire according to claim 2, wherein
the radius of curvature of the buttress profile is in a range of from 20 to 45 mm.

5. The tire according to claim 2, wherein
the sidewall portion includes a sidewall rubber disposed axially outside the carcass, and
the sidewall rubber has a loss tangent of less than 0.14 measured at 70 degrees Celsius.

6. The tire according to claim 2, wherein
a minimum rubber thickness from the buttress profile to an outer surface of the carcass is from 1.5 to 8 mm.

7. The tire according to claim 1, wherein
the radius of curvature of the shoulder profile is in a range of from 40 to 50 mm.

8. The tire according to claim 1, wherein
the radius of curvature of the buttress profile is in a range of from 20 to 45 mm.
9. The tire according to claim 1, wherein
the sidewall portion includes a sidewall rubber disposed axially outside the carcass, and
the sidewall rubber has a loss tangent of less than 0.14 measured at 70 degrees Celsius.
10. The tire according to claim 1, wherein
a minimum rubber thickness from the buttress profile to an outer surface of the carcass is from 1.5 to 8 mm.

\* \* \* \* \*